Patented May 15, 1923.                                                        1,455,598

UNITED STATES PATENT OFFICE.

WILLIAM SWANTON BARRIE AND LAWRENCE CHADWICK, OF SELWYN, VIA TOWNSVILLE, QUEENSLAND, AUSTRALIA.

AROMATIC HYDROCARBON CEMENT.

No Drawing.          Application filed March 8, 1921. Serial No. 450,634.

(GRANTED UNDER THE PROVISIONS OF THE ACT OF MARCH 3, 1921, 41 STAT. L., 1313.)

*To all whom it may concern:*

Be it known that WILLIAM SWANTON BARRIE and LAWRENCE CHADWICK, both of Selwyn, via Townsville, in the State of Queensland, Commonwealth of Australia, subjects of the King of Great Britain, have invented certain new and useful Improvements in Aromatic Hydrocarbon Cement, of which the following is a specification.

The said aromatic cement is a chemically prepared compound as follows:—

Pitch, tar or any other substance which consists principally of aromatic hydrocarbonaceous matter of an aggregate specific gravity of not less than one decimal one (1.1) is first brought to a temperature of one hundred and twenty degrees centigrade to one hundred and eighty degrees centigrade (120° C. to 180° C.) in any suitable vessel by any convenient means.

To the said aromatic hydrocarbonaceous matter thoroughly heated throughout to the said temperature namely (120° C. to 180° C.) is then added in powdered form any one or more of the following series of sulphates; stirring gently at the same time to help on the action while maintaining the said temperature throughout the operation:—

Calcium sulphate, strontium sulphate, barium sulphate, iron sulphate (ferrous or ferric), aluminium sulphate or any of the alums or pseudo alums, chromium sulphate, copper sulphate, lead sulphate, zinc sulphate, manganese sulphate, magnesium sulphate, sodium sulphate or bisulphate, potassium sulphate.

The said sulphates may be either anhydrous or hydrated, chemically prepared or as found in nature. As examples of naturally occurring sulphates the following may be mentioned, namely, gypsum, anhydrite, alunite and barite, which are known to occur in large deposits of more or less good quality throughout Australia.

These raw materials contain more or less of one or more sulphates, of the aforesaid series.

In a pure state they may be graphically represented thus:—

$Al_2(SO_4)_3,K_2SO_4,2Al_2O_3,8H_2O$ — alunite.
$CaSO_4$—anhydrite.
$CaSO_4.2H_2O$—gypsum.
$BaSO_4$—barite or barytes.

The term "sulphate material" used throughout this specification includes the above raw materials as well as any other material consisting principally of one or more of the sulphate series given.

The term aromatic hydrocarbonaceous matter or simply hydrocarbonaceous matter used throughout these documents includes only those materials which wholly or principally consist of hydrocarbons of the aromatic series, for example, pitch or tar from coal distillation, and not bodies which wholly or principally consist of fatty hydrocarbons. The word aromatic is therefore used in a purely scientific sense so as to more clearly define the nature of the material in question.

In adding the powdered sulphate material to the said aromatic hydrocarbonaceous matter this is done in quantities commensurate with the speed of the action taking place.

The proportion of powdered sulphate material added to the aromatic hydrocarbonaceous matter should not be less than one part by volume of the former to one part by volume of the latter; and should not exceed four parts by volume of the powdered sulphate material to one part by volume of the aromatic hydrocarbonaceous matter, otherwise the strength of the resultant aromatic cement would be greatly impaired.

Any proportion of the powdered sulphate material to the aromatic hydrocarbonaceous matter which lies between the aforesaid limits may be made use of in making aromatic cement according to the necessary cementation it is required to perform. As the proportion of powdered sulphate material to the hydrocarbonaceuos matter is increased towards the said maxmum limit the strength of the resultant aromatic cement increases also.

Foaming occurs as the powdered sulphate material is being added to the hydrocarbonaceous matter, particularly at the commencement of the operation but becomes somewhat sluggish as the sulphate material is further added.

When the desired amount of sulphate material has been added, the end of this step is indicated by the cessation of foaming; the mass at this stage of the operation now having subsided into a quiet boiling condition; the compound is then ready for cementation work, and when used for such purpose it must be mixed with the material it is required to bond together within the aforesaid temperature limits.

If the said mixing be attempted while the temperature of the aromatic cement is below the said lower limit, the thorough coating of the particles of material it is being used to bond together becomes an impossibility and therefore the strength of the resultant mass is greatly diminished.

Consequently should the aromatic cement be any colder than the said lower temperature limit it must be heated to within the said temperature limits before it is ready for cementation work. In any aromatic cementation work whether the aromatic cement be used alone or in conjunction with any other solid matter the strength of the resultant mass is greatly increased by the application of pressure to same in the form of rolling, tamping, ramming or any other method of the like.

The following examples of solid matter referred to above may be mentioned, viz:—

River sand, gravel, broken rock, or mineral matter of any mesh—sawdust or any trade waste of the like.

Care should be taken to exclude slimes, clays, soil or other loamy matter as far as possible, as in such cases the strength and solidity of the resultant mass would be seriously lessened.

The following method which is only a modification of the foregoing directions for making aromatic cement may also be used to advantage:—

The said hydrocarbonaceous matter is placed together with the said powdered sulphate material in the said relative proportions in a closed vessel in which the pressure may be considerably varied at will by any convenient means.

The contents of the said vessel are then raised to brisk boiling point by the application of heat.

Provision should be made to prevent the bursting of the vessel by use of safety valve or other suitable exit for any gaseous volatile products.

The function of the increased pressure within the said vessel is to elevate the boiling temperature of the said contents and consequently to bring about a more speedy, thorough and efficient production of the aromatic cement.

The end of the operation when using the above modification of making aromatic cement is found by extracting a little of the product from the vessel for examination.

When the cement is considered of a satisfactory quality the temperature of same is reduced to within the said temperature limits before its application in said cementation work.

Any volatile products which pass out of the mass occurring during the production of aromatic cement as herein outlined may be conducted through any suitable condensing appliance to be afterwards returned (or as chemically termed refluxed back) thereto, to be used as fuel for generating the heat required in the process of making aromatic cement, or otherwise disposed of as circumstances direct.

*Properties of aromatic cement.*

Aromatic cement or any aromatic cement aggregate produced as herein instructed does not obtain the maximum strength until it has thoroughly cooled.

*Welding.*—This can be accomplished by heating the outside portions of the cement then pressing the two heated parts firmly together and allowing them to thoroughly cool.

*Adhesion.*—When brought in contact with any rough surface of any solid matter it firmly adheres to same so much so, that the cement joint is practically as strong as any other portion of the said solid substance.

*Polishing.*—This can be accomplished (1) by pressing into a mould with a smooth or polished lining (2) by friction such as rubbing with a piece of dry flannel.

*Stability.*—If subjected to most extreme climatic conditions, heavy vibration or concussion no deleterious effect results as in the case with other cements at present in use.

Further, solutions of sulphuric acid, sulphates, cyanide or caustic alkalies have no harmful effect.

*Reinforcing.*—This can be done as in other cement work.

*Utility.*—Building purposes in general such as foundations, walls, floors, ceilings, roofing, ornamental and decorative work:—

*General public work.*—Bridge building; road making; guttering, pavement, channel and fluming work; machinery foundations; as a protection of railway earth works from washaways, railway sleeper substitute (to avoid destruction by white ants, dry rot and general weathering floods or fires) and fencing posts.

*Metallurgical.*—Leaching vats, to be used for cyaniding or sulphuric acid work, pumps, pipes, or any piece of apparatus to be used in contact with cyanide or acid sulphate solutions.

Ship building and military defense work generally.

Mining and underground work.

Claims:—

1. The process of producing aromatic cement from pitch, tar or similar material, consisting principally of aromatic hydrocarbonaceous material of an aggregate specific gravity of about 1.1, said process consisting in mixing a sulphate salt with said tarry material in a fluent condition.

2. The process of producing aromatic cement from pitch, tar or similar material, consisting principally of aromatic hydrocarbonaceous material of an aggregate specific gravity of about 1.1, said process consisting in mixing a sulphate salt with said tarry material in a fluent condition, the sulphate being added a little at a time.

3. The process of manufacturing a cement which consists in mixing together pitch, tar or similar material of a specific gravity of about 1.1 and sulphate salt material in a suitable closed vessel and raising the contents to boiling point by the application of heat, whereby the said contents are converted into cement substantially as described.

4. A cement comprising the products resulting from heating tar-like material having a specific gravity of about 1.1 and sulphate salt material.

5. A plastic composition comprising filling material and a binder which is the product resulting from heating tar-like material having a specific gravity of about 1.1 and sulphate salt material.

In testimony whereof we have affixed our signatures in presence of two subscribing witnesses.

WILLIAM SWANTON BARRIE.
LAWRENCE CHADWICK.

Witnesses:
    ROSE EILLEEN ROGERS,
    ARTHUR HAYES.